(12) United States Patent
Lee et al.

(10) Patent No.: US 7,333,969 B2
(45) Date of Patent: Feb. 19, 2008

(54) APPARATUS AND METHOD FOR SYNTHESIZING EMOTIONS BASED ON THE HUMAN NERVOUS SYSTEM

(75) Inventors: Mi-hee Lee, Kyungki-do (KR); Seok-won Bang, Seoul (KR); Hyoung-ki Lee, Kyungki-do (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 859 days.

(21) Appl. No.: 10/265,259

(22) Filed: Oct. 7, 2002

(65) Prior Publication Data

US 2003/0067486 A1    Apr. 10, 2003

(30) Foreign Application Priority Data

Oct. 6, 2001    (KR) ............... 2001-61643

(51) Int. Cl.
G06F 9/455    (2006.01)
(52) U.S. Cl. ............... 706/52; 706/44; 706/45
(58) Field of Classification Search ............... 706/1, 706/8, 15, 16, 23, 52, 44
See application file for complete search history.

(56) References Cited

U.S. PATENT DOCUMENTS 4,850,876 A * 7/1989 Lutaenko et al. ............. 434/265
4,979,110 A * 12/1990 Albrecht et al. ............. 600/301

(Continued)

FOREIGN PATENT DOCUMENTS

| JP | 6-12401 | 1/1994 |
| JP | 8-30185 | 2/1996 |
| KR | 2001-53488 | 6/2001 |
| KR | 2001-0071833 | 7/2001 |
| KR | 2001-71833 | 7/2001 |

OTHER PUBLICATIONS

Improved Heart Rate Variability Signal Analysis from the Beat Occurence Times According to the IPFM Model. Pablo Laguna and Javier Mateo. IEEE Transacton on Biomedical Engineering, vol. 47, No. 8, Aug. 2000.*

(Continued)

*Primary Examiner*—Anthony Knight
*Assistant Examiner*—Adrian Kennedy
(74) *Attorney, Agent, or Firm*—Buchanan Ingersoll & Rooney PC

(57) ABSTRACT

Disclosed is a nervous system-based emotion synthesizing apparatus which enables an emotion of a humanoid to be synthesized in a manner similar to that of a human using a nervous system-adjusting mechanism of a human body according to emotions. The human nervous system-based emotion synthesizing apparatus, includes a stimulus sensor portion having at least a stimulus sensor for sensing an external stimulus, an emotion generator for generating an predetermined emotion corresponding to the sensed external stimulus, a physiological signal generator for generating at least one artificial physiological signal in response to the sensed stimulus and the generated emotion, and an emotional behavior generator for generating at least one emotional behavior through a predetermined physical reaction in response to the sensed stimulus and the generated emotion, whereby the generated artificial physiological signal is fed back to the emotion generator and the emotional behavior generator, and the generated emotional behavior is fed back to the emotion generator and the physiological signal generator so that the emotion, the artificial physiological signal and the emotional behavior are combined to produce and express a complex emotion.

12 Claims, 10 Drawing Sheets

U.S. PATENT DOCUMENTS

| | | | | |
|---|---|---|---|---|
| 5,367,454 | A * | 11/1994 | Kawamoto et al. | 715/706 |
| 5,509,810 | A * | 4/1996 | Schertz et al. | 434/262 |
| 5,732,232 | A | 3/1998 | Brush, II et al. | |
| 5,853,292 | A * | 12/1998 | Eggert et al. | 434/262 |
| 5,882,206 | A * | 3/1999 | Gillio | 434/262 |
| 5,974,262 | A * | 10/1999 | Fuller et al. | 710/18 |
| 6,026,322 | A * | 2/2000 | Korenman et al. | 600/547 |
| 6,175,772 | B1 * | 1/2001 | Kamiya et al. | 700/31 |
| 6,193,519 | B1 * | 2/2001 | Eggert et al. | 434/262 |
| 6,219,657 | B1 * | 4/2001 | Hatayama | 706/14 |
| 6,273,728 | B1 * | 8/2001 | van Meurs et al. | 434/268 |
| 6,347,261 | B1 * | 2/2002 | Sakaue et al. | 700/245 |
| 6,358,201 | B1 * | 3/2002 | Childre et al. | 600/300 |
| 6,461,165 | B1 * | 10/2002 | Takashina et al. | 434/265 |
| 6,598,020 | B1 * | 7/2003 | Kleindienst et al. | 704/270 |
| 6,604,980 | B1 * | 8/2003 | Jurmain et al. | 446/296 |
| 6,656,116 | B2 * | 12/2003 | Kim et al. | 600/300 |
| 6,747,672 | B1 * | 6/2004 | Haakonsen et al. | 715/700 |
| 6,959,166 | B1 * | 10/2005 | Gabai et al. | 434/308 |
| 2002/0081937 | A1 * | 6/2002 | Yamada et al. | 446/175 |

OTHER PUBLICATIONS

Notice to Submit Response, by the Korean Patent Office on Apr. 30, 2004, Application No. 10-2001-0061643.

Korean Office Action.

Naoyuki Okada, "Trends and Themes Towards Engineering Applications of Emotion", Journal of Japan Fuzzy, Japan Fuzzy Conferences, vol. 12, No. 6, pp. 722-729 (Dec. 2000).

Takanori Shibata, "Artificial System Which Seems to Have Emotion", Journal of Japan Fuzzy, Japan Fuzzy Conferences, vol. 12, No. 6, pp. 752-761 (Dec. 2000).

Japanese Office Action, with English Translation, dated Jul. 26, 2006.

* cited by examiner

APPARATUS AND METHOD FOR SYNTHESIZING EMOTIONS BASED ON THE HUMAN NERVOUS SYSTEM

BACKGROUND OF THE INVENTION

This application claims the priority of Korean Patent Application No 2001-61643, filed Oct. 6, 2001 in the Korean Intellectual Property Office, which is incorporated herein in its entirety by reference 1. Field of the Invention The present invention relates to an emotion synthesizing apparatus, and more particularly, to a nervous system-based emotion synthesizing apparatus which enables an emotion of a human type robot (hereinafter, referred to as "humanoid") to be synthesized in a manner similar to that of a human using a nervous system adjusting mechanism of a human body according to the human emotion 2. Description of the Related Art An emotion synthesis largely consists of two processes, i.e., a generation of an emotion process and an expression of an emotion process. The emotion generation refers to a process in which an emotion of a human is changed from one state to another with respect to an external stimulation. The expression of the emotion refers to the form of the external expressive actions or a series of change modes with respect to each emotion state. Also, an emotion synthesizer refers to an artificial apparatus for implementing such an emotion synthesis.

In general, in order to actually implement a humanoid, the humanoid must be able to behave itself emotionally, which requires an emotion synthesizer. In particular, in order to ensure that an emotional interaction between a humanoid and a human is performed more naturally in such a manner that the humanoid resembles the human action more closely, an emotion synthesis of the same type as that of an emotion response mechanism of a human will be applied to the humanoid.

However, as known from U.S. Pat. No. 5,367,454 issued in Nov. 22, 1994 to Kawamoto et al, entitled "INTERACTIVE MAN-MACHINE INTERFACE FOR SIMULATING HUMAN EMOTIONS", and U.S. Pat. No. 5,732,232 issued in Mar. 24, 1998 to Brush II et al., entitled "METHOD AND APPARATUS FOR DIRECTING THE EXPRESSION OF EMOTION FOR A GRAPHICAL USER INTERFACE", etc., emotion synthesizing methods used in a conventional robot have been carried out only by optionally designed rules irrespective of an actual emotion response mechanism of a human body. Accordingly, as long as an emotional behavior of a humanoid does not conform to a response mechanism of the autonomic nervous system of a human, there is a limitation on that the humanoid does not closely resemble a human.

SUMMARY OF THE INVENTION

To solve the above-described problems, it is an object of the present invention to provide a humanoid emotion synthesizer which can analyze both an emotion response mechanism and an autonomic nervous system response mechanism of a human and imitates both of types mechanisms.

It is another object of the present invention to provide a humanoid emotion synthesizer which is controlled by a given input, such as a physiological signal, and whose output is generally expressed by a motion and a recognized emotion.

A preferred version of the synthesizing apparatus of the present invention includes a stimulus sensor portion having at least a stimulus sensor for sensing an external stimulus; an emotion generator for generating an predetermined emotion corresponding to the sensed external stimulus, a physiological signal generator for generating at least one artificial physiological signal in response to the sensed stimulus and the generated emotion, and an emotional behavior generator for generating at least one emotional behavior through a predetermined physical reaction in response to the sensed stimulus and the generated emotion, whereby the generated artificial physiological signal is fed back to the emotion generator and the emotional behavior generator, and the generated emotional behavior is fed back to the emotion generator and the physiological signal generator so that the emotion, the artificial physiological signal and the emotional behavior are combined to produce and express a complex emotion.

According to another embodiment of the present invention, there is also provided a human nervous system-based emotion synthesizing method, comprising the steps of (a) receiving and sensing an external stimulus, (b) generating a predetermined emotion corresponding to the sensed external stimulus; (c) generating a physiological signal corresponding to the predetermined emotion, and generating an emotional behavior corresponding to the predetermined emotion, respectively, (d) providing the generated physiological signal and the generated emotional behavior to the step (b) and (c), (e) repeatedly performing the steps (b) and (c) in response to the generated predetermined emotion, the physiological signal and the emotional behavior, and then combining the generated predetermined emotion, the physiological signal and the emotional behavior together to generate a complex emotion, and (f) expressing the generated complex emotion in a form of an appropriate emotional behavior.

BRIEF DESCRIPTION OF THE DRAWINGS

The above objects and advantages of the present invention will become more apparent by describing in detail the preferred embodiments thereof with reference to the attached drawings in which.

DETAILED DESCRIPTION OF THE INVENTION

Hereinafter, a preferred embodiment of the present invention will be in detail described with reference to the accompanying drawings.

Figure 1:
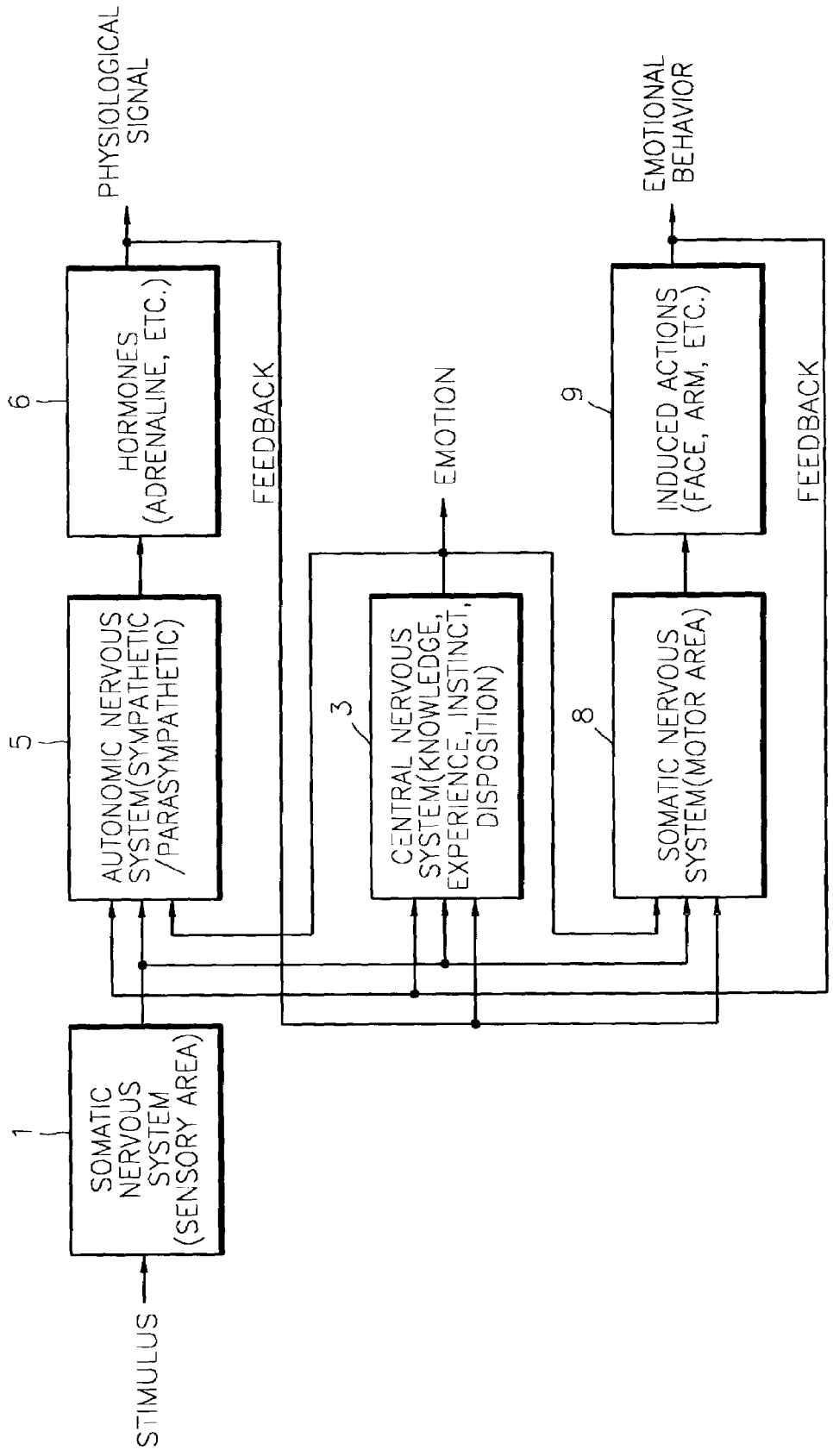
FIG. 1 is a block diagram illustrating a model of a human emotion synthesizing principle to be applied to a humanoid emotion synthesizer according to a preferred embodiment of the present invention.

FIG. 1 is a block diagram illustrating a model of a human emotion synthesizing method to be applied to a humanoid emotion synthesizer according to a preferred embodiment of the present invention.

As shown in FIG. 1, an emotional response of a human is performed by a response mechanism of the autonomic nervous system. Accordingly, in order to ensure that a humanoid implements the same emotional behavior as that of a human or an emotional behavior similar to a human, such a humanoid emotion synthesizer must also include the response mechanism of the autonomic nervous system of a human.

The James-Lange theory and the Schachter-Singer theory, which are typical theories about emotions of a human, have suggested that when one's emotion occurs due to an external environmental stimulus, one's brain perceives bodily responses according to an arousing situation of the autonomic nervous system such as variations in breathing and heart rate, facial expressions, motions, etc. Hence, the emotion appropriate to the arousing situation can be determined and experienced. Feedback processes are performed between these changes in physiological responses of the autonomic nervous system and the perception response of the human brain to the changes so that an adjustment of the emotion is carried out.

Figure 2:
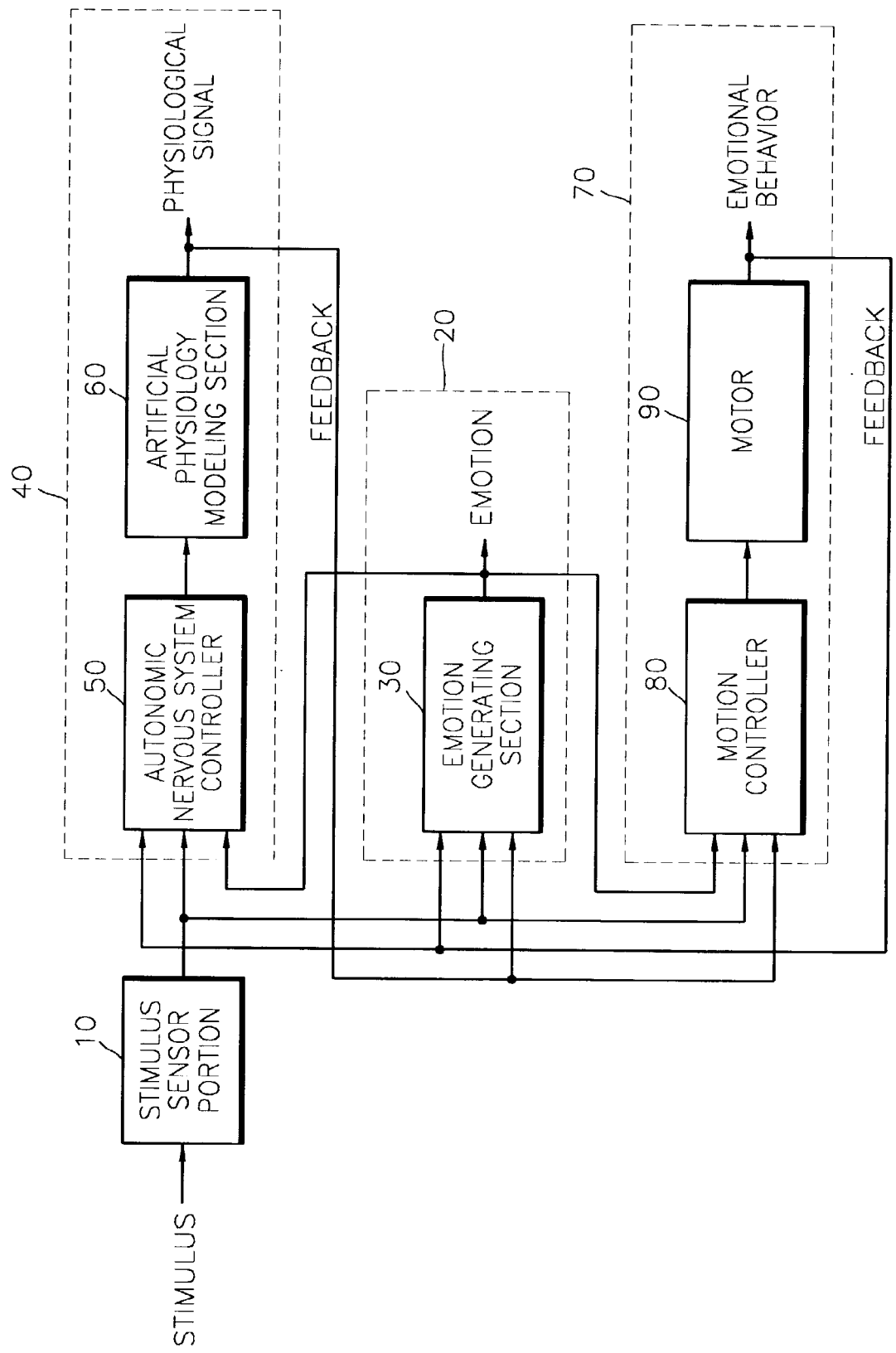
FIG. 2 is a block diagram illustrating the construction of a humanoid emotion synthesizer to which the human emotion synthesizing principle shown in FIG. 1 is applied according to the present invention.

Accordingly, the present invention presents a human emotion synthesizing method based on the above mentioned James-Lange theory and Schachter-Singer theory and imitates the human emotions so as to constitute a humanoid emotion synthesizer as shown in FIG. 2.

Referring back to FIG. 1, the nervous system associated with a synthesis of a human emotion largely consists of somatic nervous systems 1 and 8, a central nervous system 3, and an autonomic nervous system 5. When an external environmental stimulus that can induce emotions such as sight, hearing, olfaction, taste, tactual sense, etc., reaches the human body, the somatic nervous system (sensory area) 1 contained in the brain detects the external stimulus to transmit the detected stimulus information to the central nervous system 3, the autonomic nervous system 5 and the somatic nervous system (motor area) 8, respectively.

Like this, when an external stimulus is conveyed to the human body, the central nervous system 3 determines the type of the emotion (for example, happiness, sadness, anger, fear, surprise, disgust, etc) appropriate to the detected stimulus information based on knowledge, experience, instinct, disposition, etc, which one possesses originally. At this time, the autonomic nervous system 5 is influenced by variations in concentration of Norepinephrine (NE) and Acetycholine (Ach) which are chemical neurotransmitters affecting a sympathetic nervous system and a parasympathetic nervous system while an interaction between the two sympathetic and parasympathetic nervous systems are antagonistic with respect to each other to affect hormones such as Adrenaline, Noradrenaline, Dorpamine, Endorphine, etc. Owing to variations in both concentrations of the chemical neurotransmitters of the autonomic nervous system 5 and evaluation values of the hormones 6 according to an endocrine response, the parameters of physiological signals (for example, electroencephalogram (EEG), electrooculogram (EOG), electromyogram (EMG), electrocardiogram (ECG), electrodemal activity (EDA), skin temperature (SKT), respirations (Resp.), etc) are changed. Also, the somatic nervous system 8 affects the emotional behaviors such as conduct, facial expression, tone color (or timbre), gesture, etc, using some induced actions 9.

As described above the outputs (for example, a change in a physiological signal due to the autonomic nervous system 5, a determination of an emotion due to the central nervous system 3 and a change in a behavior due to the somatic nervous system 8) from each of the nervous systems are associated with each other under a feedback relation as shown in FIG. 1. For example, in the case where the somatic nervous system 1 senses a violent scene as a stimulus from the outside, the motor area of the somatic nervous system 8 may induce a reflex action which allows him or her to reflexly close his or her eyes in response to the sensed stimulus, and the somatic nervous system 1 may stimulate the autonomic nervous system 5 to affect the hormone 6 thereof so that breathing and heart rate are increased. Further, such a stimulus may stimulate the central nervous system 3 to induce the emotion of "anger" through a memory and an experience of the past These outputs from the respective nervous systems may mutually undergo a feedback process to occur a more intense feeling, or to naturally adjust his or her emotional response to an endurable emotion level.

FIG. 2 is a block diagram illustrating the construction of a humanoid emotion synthesizer to which the human emotion synthesizing principle shown in FIG. 1 is applied according to a preferred embodiment of the present invention.

Referring to FIG. 2, there is shown the humanoid emotion synthesizer of the present invention including a stimulus sensor 10 for receiving an external stimulus from the outside and sensing the received external stimulus, an emotion generating unit 20 for generating a predetermined emotion corresponding to the sensed external stimulus, a physiological signal generating unit 40 for generating at least one artificial physiological signal in response to the sensed stimulus and the generated emotion, and an emotional behavior generating unit 70 for generating at least one emotional behavior as a physical reaction in response to the sensed stimulus and the generated emotion. In this case, an output (i.e, a physiological signal) of the physiological signal generating unit 40 is fed back to the emotion generating unit 20 and the emotional behavior generating unit 70, and an output (i.e, an emotional behavior) of the emotional behavior generating unit 70 is fed back to the emotion generating unit 20 and the physiological signal generating unit 40 so that a complex emotion is produced and expressed.

Now, the construction and operation of the humanoid emotion synthesizer of the present invention will be in detail described hereinafter with reference to FIG. 2.

Referring back to FIG. 2. the stimulus sensor 10 is provided with a camera, a microphone a tactile sensor, an olfactory sensor, a taste sensor, etc, so that it can receive an external stimulus such as an image, a sound, a touch, a scent, a taste, etc. Also the stimulus sensor 10 performs a function corresponding to that of the sensory area of the somatic nervous system 1 shown in FIG. 1.

The emotion generating unit 20 includes an emotion generating section 30 for generating a predetermined emotion appropriate to the external stimulus sensed by the stimulus sensor 10 according to a predefined rule. The emotion generating section 30 is constructed from a fuzzy-rule based system or an artificial intelligence (AI) processor. Also, the emotion generating section 30 produces a predetermined emotion from the external stimulus applied thereto from the stimulus sensor 10, the emotional behavior fed back thereto from the emotional behavior generating unit 70, and the physiological signal fed back thereto from the physiological signal generating unit 40. Also, the emotion generating section 30 performs a function corresponding to that of the central nervous system 3 shown in FIG. 1.

The physiological signal generating unit 40 includes an autonomic nervous system (ANS) controller 50 for modeling a concentration of a neurotransmitter affecting an autonomic nervous system in response to the external stimulus applied thereto from the stimulus sensor 10, the predetermined emotion produced from the emotion generating unit 20 and the emotional behavior fed back thereto from the emotional behavior generating unit 70, and an artificial physiology modeling section 60 for generating a physiological signal in response to the concentration of the neurotransmitter modeled by the autonomic nervous system controller 50. The artificial physiology modeling section 60 acts to model the physiological signals such as electroencephalogram (EEG), electrooculogram (EOG), electromyogram (EMG), electrocardiogram (ECG), electrodemal activity (EDA), skin temperature (SKT) and respirations (Resp) generated from an artificial electroencephalograph, an artificial heart, an artificial respirator and an artificial body temperature adjustor. Also, the autonomic nervous system controller 50 performs a function corresponding to that of the autonomic nervous system 5 shown in FIG. 1, and the artificial physiology modeling section 60 performs a function corresponding to that of the hormones 6 shown in FIG. 1.

The emotional behavior generating unit 70 includes a motion controller 80 for generating a control signal to control the emotional behavior in response to the external stimulus applied thereto from the stimulus sensor 10, the predetermined emotion produced from the emotion generator 50 and the physiological signal fed back thereto from the physiological signal generating unit 40, and a motor 90 for action output, such as a voice, a facial expression, etc., appropriate to each of the emotions through a predetermined physical reaction (for example, the movements of a head, a leg, etc, of a humanoid) in response to the control signal from the motion controller 80. Also, the motion controller 80 performs a function corresponding to that of the motor area of the somatic nervous system 8 shown in FIG. 1, and the motor 9 performs a function corresponding to that of the locomotive organ 9 shown in FIG. 1.

Figure 3:
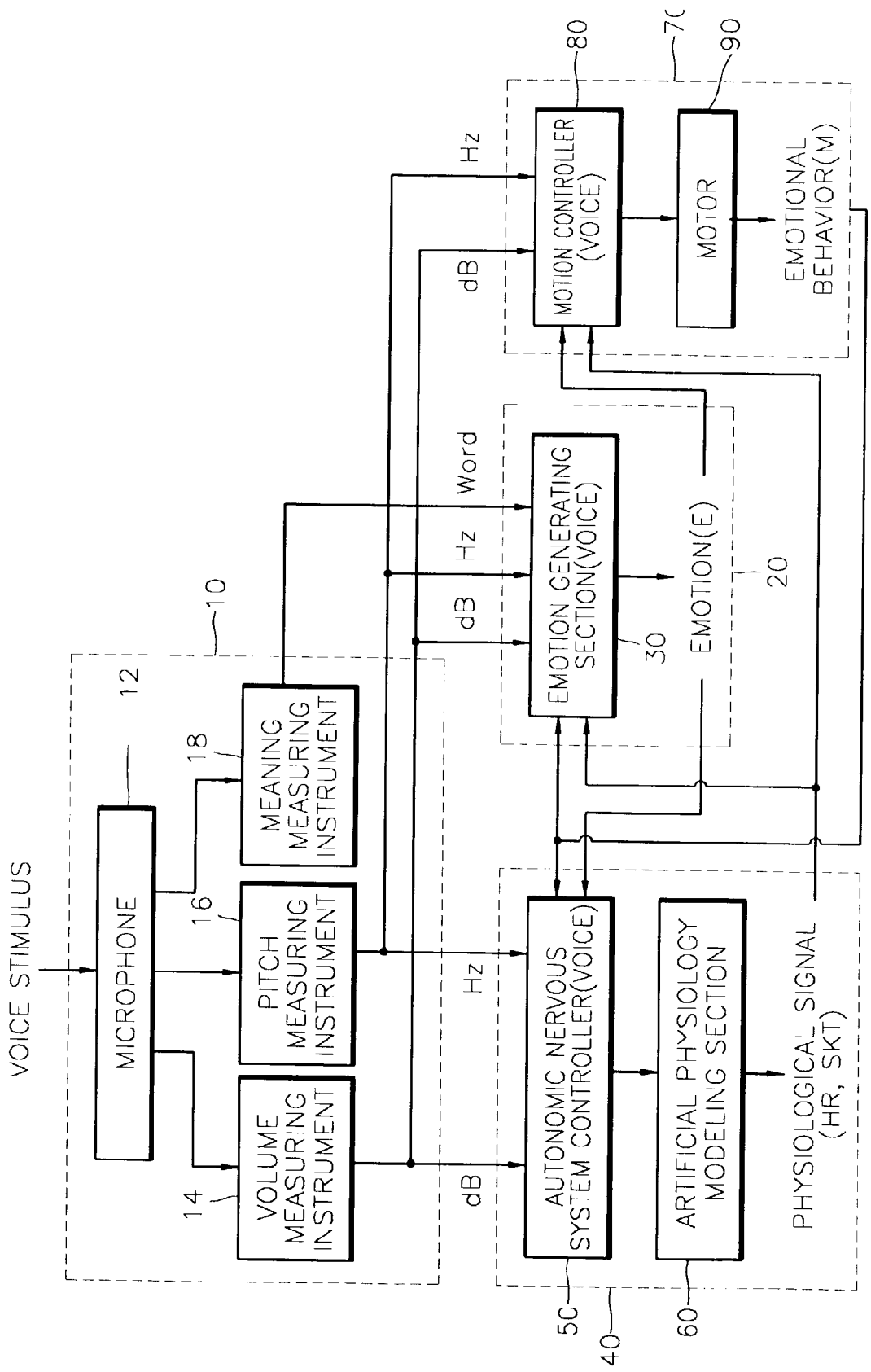
FIG. 3 is a block diagram illustrating the construction of a humanoid emotion synthesizer operated in response to a voice stimulus according to a preferred embodiment of the present invention.

FIG. 3 is a block diagram illustrating the construction of a humanoid emotion synthesizer operated in response to a voice stimulus according to a preferred embodiment of the present invention.

Referring to FIG. 3, there is shown an operational construction of the humanoid emotion synthesizer according to the present invention applicable to the case where the humanoid emotion synthesizer of FIG. 2 is operated in response to an external voice stimulus. The humanoid emotion synthesizer has the same construction as that of the humanoid emotion synthesizer shown in FIG. 2 except that the stimulus sensor 10 of FIG. 3 is composed of a microphone 12, a volume measuring instrument 14, a pitch measuring instrument 16 and a meaning measuring instrument 18. Accordingly, for the sake of simplicity, in the drawing, the same or similar blocks are denoted by the same reference numerals even though they are depicted in different drawings. The detailed description of known functions and configurations incorporated herein will be omitted when it may make the subject matter of the present invention rather unclear.

Figure 4:
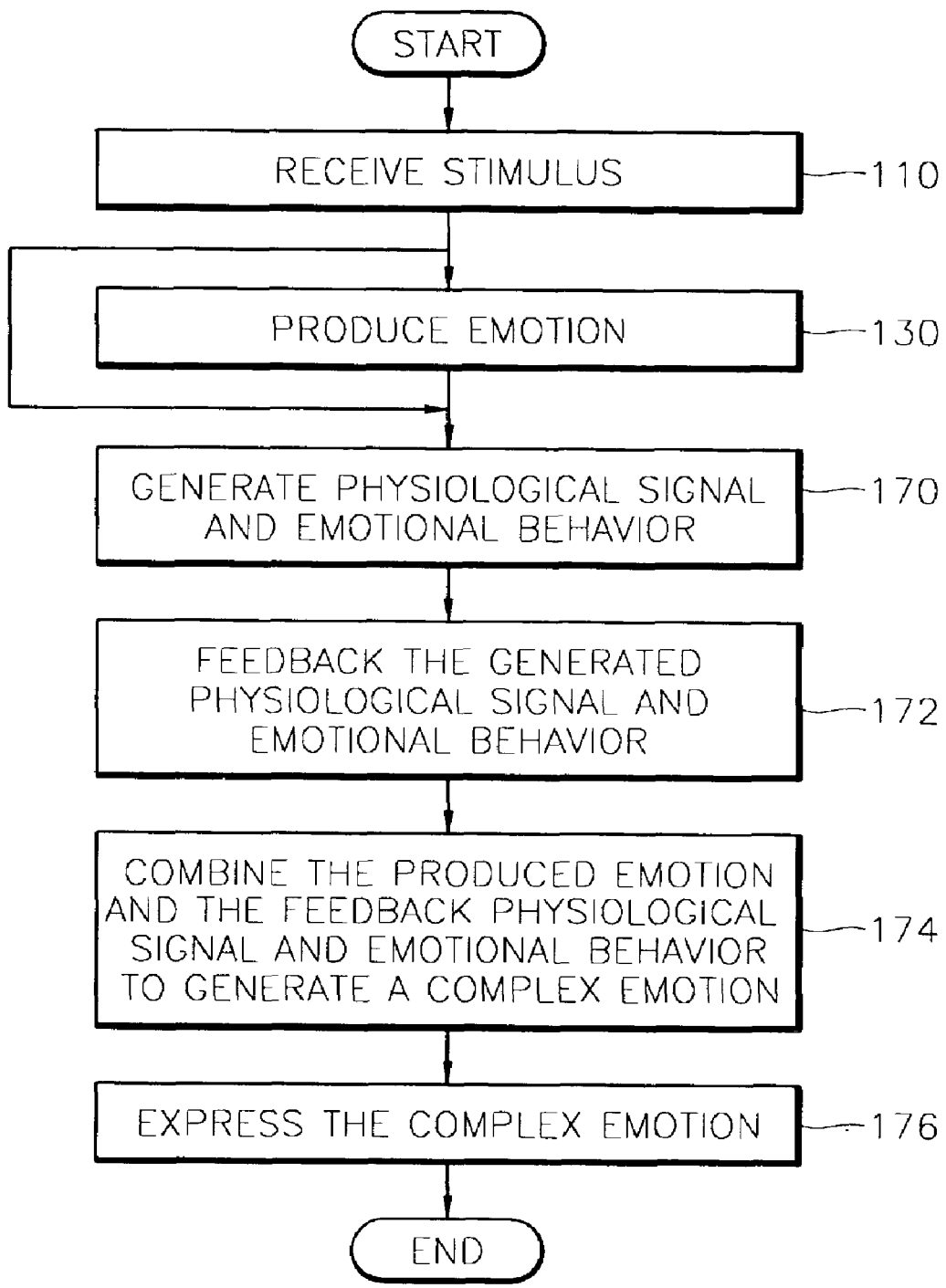
FIG. 4 is a flow chart illustrating a process routine for explaining the operation of the humanoid emotion synthesizer shown in FIGS. 2 and 3.

FIG. 4 is a flow chart illustrating a process routine for explaining the operation of the humanoid emotion synthesizer shown in FIGS. 2 and 3.

A process routine for explaining the operation of the humanoid emotion synthesizer will be described in detail hereinafter with reference to FIG. 3.

Referring to FIG. 4, a stimulus sensor 10 of the humanoid emotion synthesizer according to the present invention first receives an external stimulus (step 110). For example, like in the case of FIG. 3, when an external voice stimulus is inputted to the humanoid emotion synthesizer, the stimulus sensor 10 receives and detects the external stimulus through a microphone 12 included therein. At this time, the stimulus sensor 10 performs the measurement of volume, pitch and meaning with respect to the received voice stimulus data. The data measured by the stimulus sensor 10 is applied to the emotion generating section 30 of the emotion generating unit 20 and/or the autonomic nervous system controller 50 of the physiological signal generating unit 40 and the motion controller 80 of the emotional behavior generating unit 70 to generate a predetermined emotion (E) and/or emotional behavior (M).

That is, the emotion generating section 30 generates a predetermined emotion corresponding to the external stimulus in response to the measured data (step 130). The emotion (E) generated from the emotion generating section is applied to the autonomic nervous system controller 50 and the motion controller 80 which in turn allows the artificial physiology modeling section 60 and the motor 90 to generate physiological signals (HR, SKT) and an emotional behavior (M), respectively (step 170). At this point, the autonomic nervous system controller 50 and the motion controller 80 may respond directly to the external stimulus to generate the physiological signals (HR, SKT) and the emotional behavior (M).

The physiological signals (HR, SKT) generated from the artificial physiology modeling section 60 is fed back to the emotion generating section 30 and the motion controller 80, respectively, and the emotional behavior (M) generated from the motor 90 is fed back to the emotion generating section 30 and the autonomic nervous system controller 50, respectively (step 172). Also, the emotion (E) generated from the emotion generator, the physiological signals (HR, SKT) fed back to the emotion generating section 30 from the artificial physiology modeling section 60 and the emotional behavior (M) fed back to the emotion generating section 30 from the motor 90 are combined with each other to generate a complex emotion (step 174), so that the complex emotion can be expressed in a form of a resultant emotional behavior through a predetermined physical reaction corresponding to the generated complex emotion and the physiological signals (HR, SKT) fed back to the emotion controller 80 from the artificial physiology modeling section 60.

More specifically, the emotion generating section 30 receives and combines the external stimulus information (dB, Hz, Word) recognized by the stimulus sensor 10, the physiological signals (HR, SKT) fed back thereto from the artificial physiology modeling section 60 of the physiological signal generating unit 40 and the emotional behavior (M) fed back thereto from the motor 90 of the emotional behavior generating unit 70 to generate a synthetic emotion which is, in turn, applied to the autonomic nervous system controller 50 and the motion controller 80, respectively.

The autonomic nervous system controller 50 receives the external stimulus information (dB, Hz, Word) recognized by the stimulus sensor 10, the synthetic emotion generated from the emotion generator 30 and the emotional behavior (M) fed back thereto from the motor 90 of the emotional behavior generating unit 70, and then combines these data to generate a synthetic physiological signal. The motion controller 80 receives the external stimulus information (dB, Hz, Word) recognized by the stimulus sensor 10, the synthetic emotion generated from the emotion generating section 30 and the physiological signals (HR, SKT) fed back thereto from the artificial physiology modeling section 60, and then combines these data to generate a synthetic emotion (M). As a result, a combined complex emotion is expressed in a format of a physiological signal and an emotional behavior (step 176).

The construction and operation of the constituent elements of the humanoid emotion synthesizing apparatus for performing the above mentioned operation will now be described in more detail hereinafter.

Figure 5:
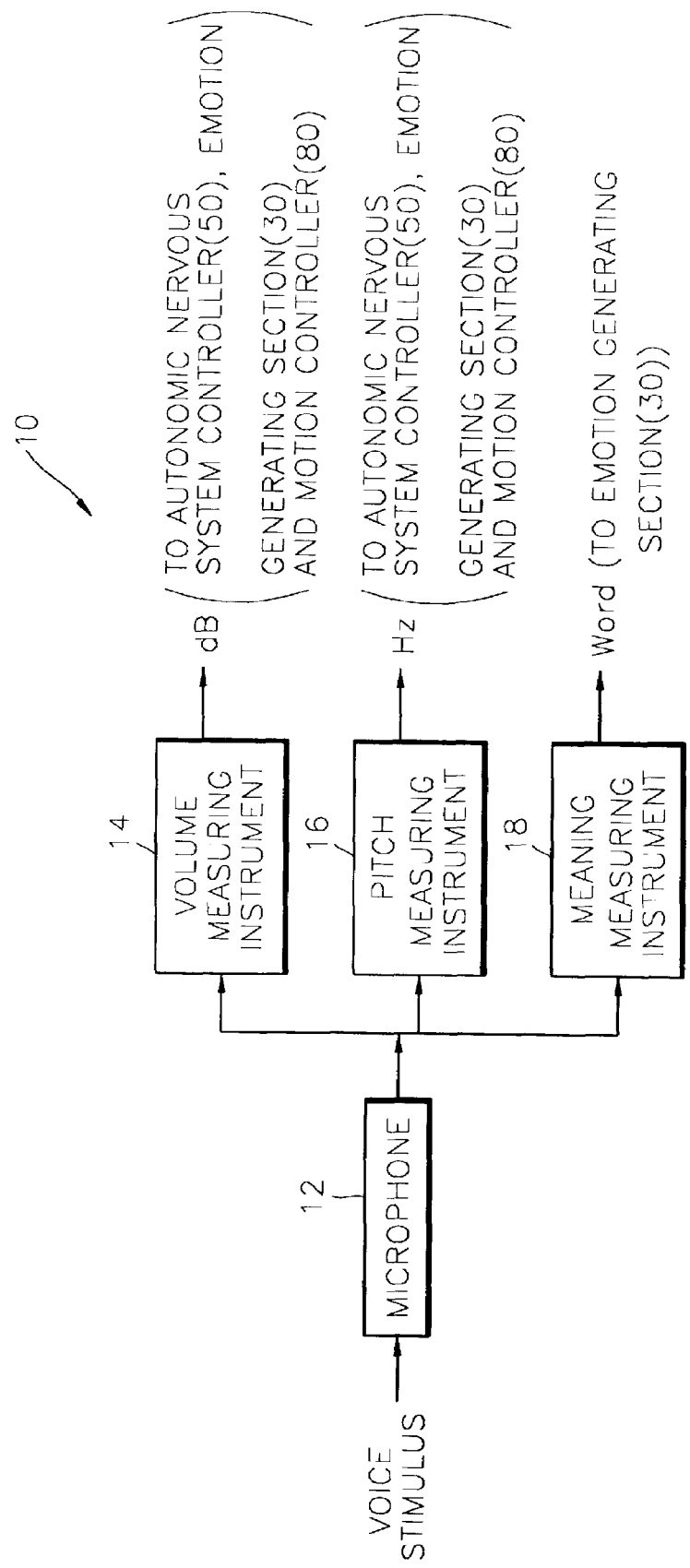
FIG. 5 is a block diagram illustrating the construction of a stimulus sensor shown in FIG. 3.

FIG. 5 is a block diagram illustrating the construction of a stimulus sensor 10 shown in FIG. 3.

Referring to FIG. 5, there is shown a stimulus sensor 10 for receiving a voice stimulus from the outside, which includes a microphone 10 for data input of the voice stimulus to other constituent elements, a voice measuring instrument 14 for measuring a volume of the input voice data thereto from the microphone 12 and indicating the measured volume data in a decibel (dB) unit, a pitch measuring instrument 16 for measuring a pitch of the input voice data thereto from the microphone 12 and indicating the measured pitch data in a frequency (Hz) unit, and a meaning measuring instrument 18 for measuring a meaning of the input voice data thereto from the microphone 12 and indicating the measured meaning data in a word unit. The external stimulus data (dB, Hz) detected by the stimulus sensor 10 is supplied to the emotion generating section 30 and the autonomic nervous system controller 50, the external stimulus data (Word) is supplied to the motion controller 80 so that these data are used to perform production of an emotion and synthesis of the emotion to express the produced emotion.

Figure 6:
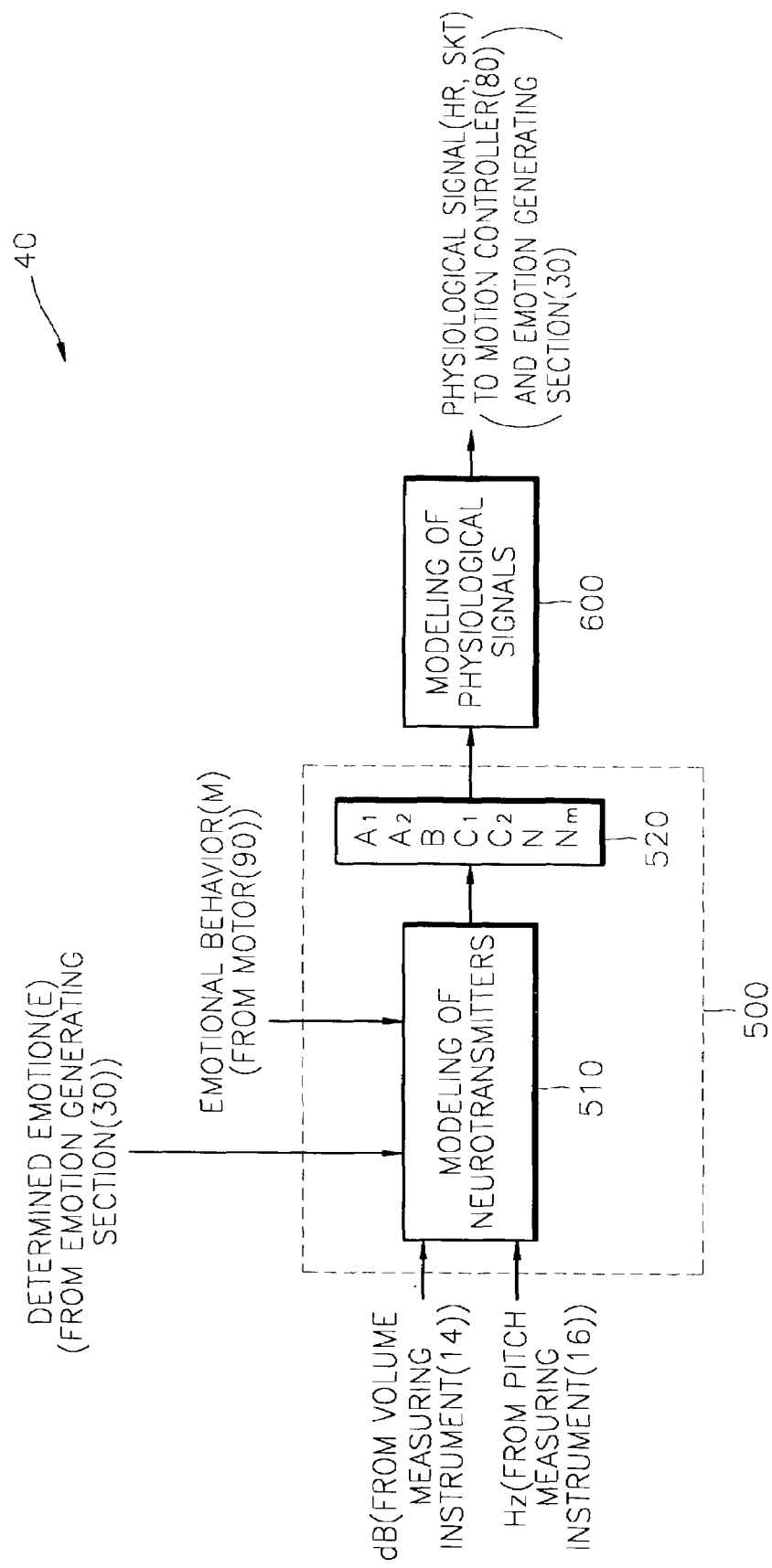
FIG. 6 is a block diagram illustrating the operational construction of a physiological signal-generating unit shown in FIGS. 2 and 3.

FIG. 6 is a block diagram illustrating the operational construction of a physiological signal generating unit 40 shown in FIGS. 2 and 3.

Referring to FIG. 6, the autonomic nervous system controller 50 included in the physiological signal generating unit 40 performs the operation (510) of modeling neurotransmitters and the operation (520) of generating physiological emotion elements (A1, A2, B, C1, C2, N, Nm) corresponding to an effect of an human autonomic nervous system, and the artificial physiology modeling section 60 performs the operation of modeling the physiological signals in response to the physiological emotion elements (A1, A2, B, C1, C2, N, Nm) generated from the autonomic nervous system controller 50.

Figure 7:
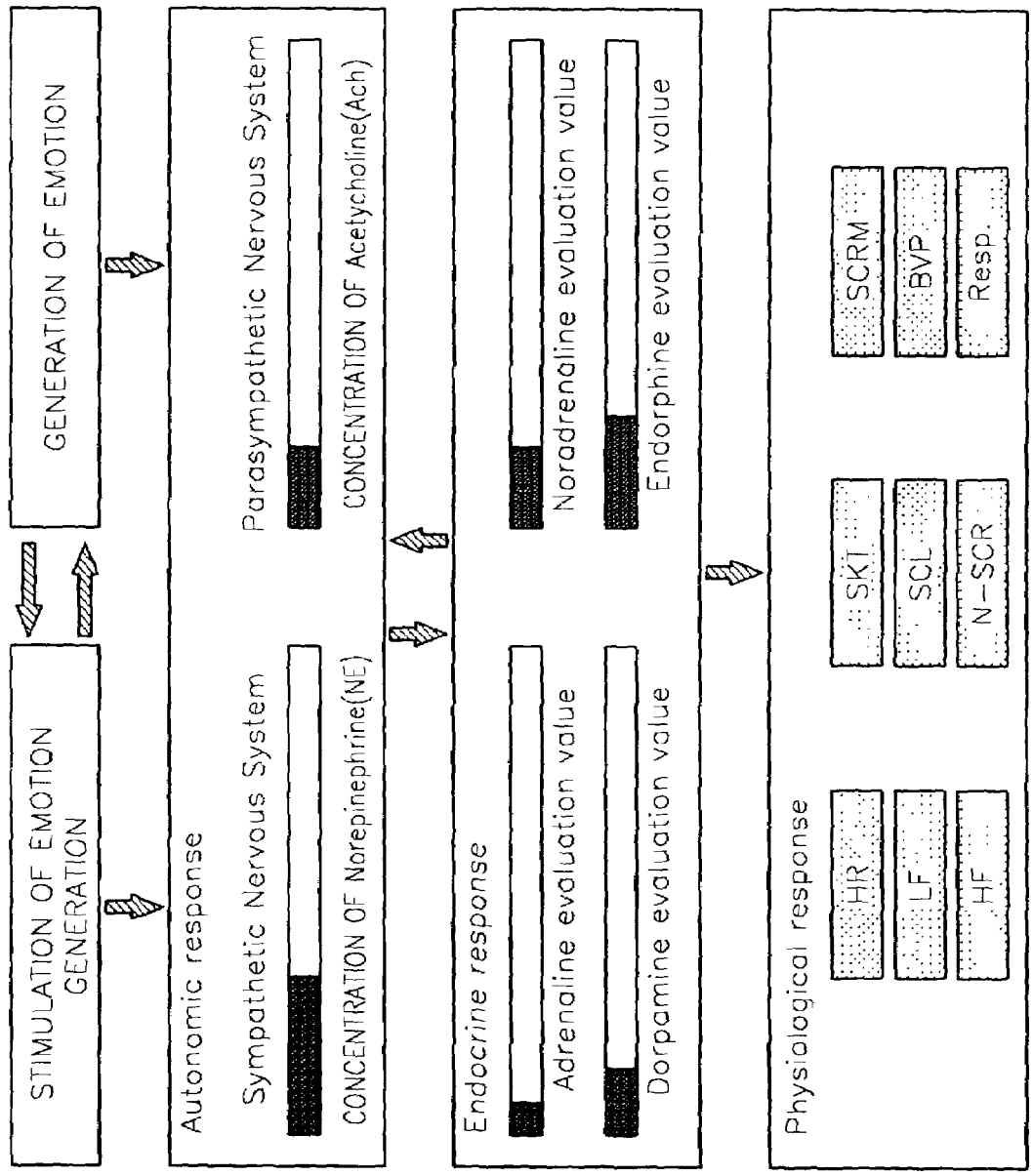
FIG. 7 is a diagrammatical view illustrating a variation in concentrations of hormones depending on a determination of an emotion.

FIG. 7 is a diagrammatical view illustrating a variation in a concentration of hormones depending on a determination of an emotion.

Referring to FIG. 7, the determination of an emotion corresponding to an input stimulus to the stimulus sensor 10 from the outside changes concentrations of norepinephrine (NE) and acetycholine (Ach) as the neurotransmitters of a sympathetic nervous system and a parasympathetic nervous system, which results in variations in evaluation values of hormones such as adrenaline, noradrenaline, dorpamine, endorphine, etc, according to an endocrine response. Physiological emotion elements changed by such hormones affecting the sympathetic nervous system and the parasympathetic nervous system is determined by a predefined rule such as for example, $A_1=A_0(M*dB*Hz)*E$, $C_1=C_0(M*dB*Hz)*E$. These determined physiological emotion elements (520 of FIG. 6) are used for generating physiological signals such as electroencephalogram (EEG), electrooculogram (EOG), electromyogram (EMG), electrocardiogram (ECG), electrodemal activity (EDA), skin temperature (SKT), respirations (Resp), etc. The artificial physiology modeling section 60 (see FIG. 3) performs the modeling of the physiological signals.

A method of modeling and producing the heart rate output from a combination of these physiological emotion elements as physiological emotion elements through the artificial physiology modeling section 60 will be described in detail hereinafter with reference to FIG. 8.

Figure 8:
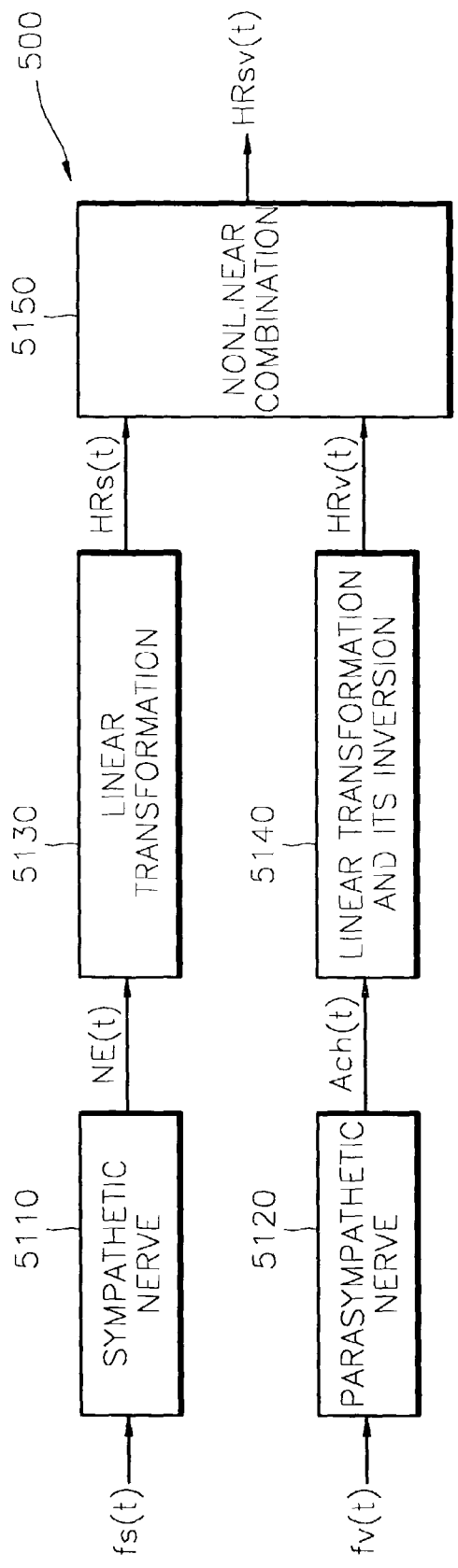
FIG. 8 is a block diagram illustrating a method of modeling concentrations of neurotransmitters as the chemicals shown in FIG. 7.

FIG. 8 is a block diagram illustrating a method of modeling a concentration of neurotransmitters as the chemicals shown in FIG. 7.

This method is an example of the Warner Model that is disclosed in "Effect of Combined Sympathetic and Vagal Stimulation on Heart Rate in the Dog" a thesis of Warner H R and Russell R O Jr. Circ Res 24(4) pp 567-573, April 1969.

Referring to FIG. 8, the input signals fs(t) and fv(t) to a sympathetic nerve 5110 and a parasympathetic nerve 5120 represent activities of the sympathetic nerve 5110 and the parasympathetic nerve 5120. Norepinephrine (NE) and acetycholine (Ach) are neurotransmitters that are secreted from the end parts of the sympathetic nerve 5110 and the parasympathetic nerve 5120, respectively.

The Warner Model results in two differential equations (HRs, HRv) associated with a re-insertion of norepinephrine (NE) and acetycholine (Ach) through a linear transformation 5130, and a linear transformation and its inversion 5140, which sufficiently represents the operation characteristic of an autonomic stimulus-neurotransmitter system. A response of the heart rate according to stimulus frequencies of efferent nerves acting on the sympathetic nerve 5110 and the parasympathetic nerve 5120 can be written as the following [Expression 1]

$$HR_{SV}=HR_V+(HR_S-HR_O)(HR_V-HR_{Min})/(HR_O-HR_{Min})$$ [Expression 1]

where $HR_V$ denotes the heart rate due to a nerve stimulus of the parasympathetic nerve 5120, and $HR_S$ denotes the heart rate due to a nerve stimulus of the sympathetic nerve 5110. Also, $HR_O$ denotes the heart rate in case of non-stimulus, and $HR_{Min}$ denotes the heart rate (about 30 beats/sec) that can be obtained only by a nerve stimulus of the parasympathetic nerve 5120.

A mathematical model of fs(t) and HRs(t) according to a stimulus of the sympathetic nerve used in [Expression 1] is given by the following [Expression 2]

$$\frac{dA_1}{dt} = \frac{K_1 n f_s + K_2(A_0 - A_1) + K_3(A_2 - A_1)}{V_1}$$ [Expression 2]

$$\frac{dA_2}{dt} = \frac{K_3(A_1 - A_2) - dAB/dt}{V_2}$$

$$B + AB = \text{constant}$$

$$\frac{dAB}{dt} = K_1 A_2 B - K_2 AB$$

$$HR_S = HR_O + K_6 AB$$

where $A_1$ denotes a concentration of norepinephrine (NE) secreted from the end part of a ganglion, and $A_2$ denotes a concentration of norepinephrine (NE) in blood when is being activated. Also, $Ki(i=1, \ldots, 6)$ denotes a constant, B denotes a concentration of norepinephrine (NE) to be expected in order to change a heart rate, n denotes the number of nerve fibers responding to a stimulus, $HR_O$ denotes the heart rate before a stimulus is generated, $V_1$ denotes a volume when a concentration of norepinephrine (NE) is $A_1$, and $V_2$ denotes a volume when a concentration of norepinephrine (NE) is $A_2$, respectively.

Subsequently, a mathematical model of fv(t) and HRv(t) according to a stimulus of the parasympathetic nerve used in [Expression 1] is given by the following [Expression 3]

$$\frac{dN}{dt} = K_7(N_m - N) + K_8 N f_s$$ [Expression 3]

$$\frac{dC_2}{dt} = \frac{nK_8 NC_1 f_s - K_9 C_2}{V_2}$$

$$P_V = P_O + K_{10} C_2 \quad (\text{for } C_2 > 0)$$

$$P_V = \infty \quad (\text{for } C_2 < 0)$$

$$HR_V = 60/P_V$$

where $P_V$ denotes a heartbeat cycle, $P_O$ denotes a heartbeat cycle before a stimulus is applied to the parasympathetic nerve, N denotes a mean value of a concentration of acetycholine (Ach), Nm denotes a maximum concentration of acetycholine (Ach) at the end part of a ganglion, $Ki(i=7,,10)$ denotes a constant, $C_1$ denotes a concentration of acetycholine (Ach) within vesicles, and $C_2$ denotes a concentration of acetycholine (Ach) outside vesicles of a sinoatrial node.

When concentrations of norepinephrine (NE) and acetycholine (Ach) are modeled based on the above-described Warner Model, the humanoid emotion synthesizing apparatus according to the present invention produces a periodical pulse of a heartbeat using the Integral Pulse Frequency Modulation (IPFM) Model.

Figure 9:
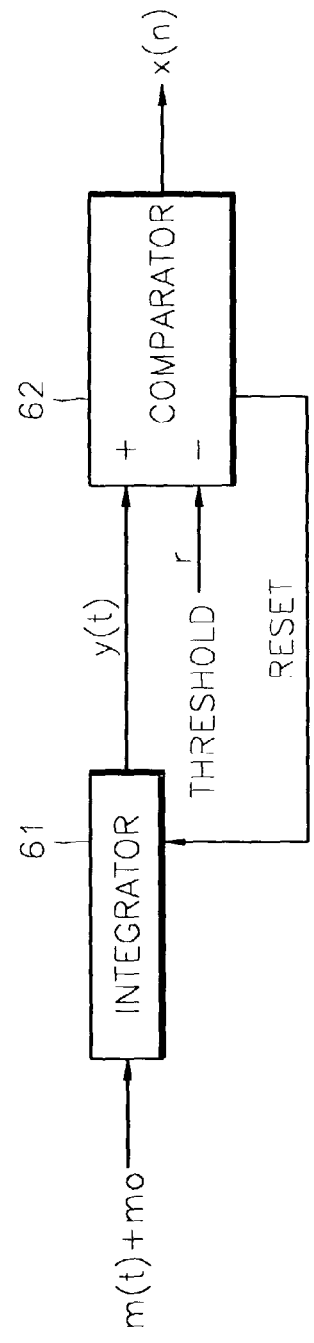
FIG. 9 is a block diagram illustrating an artificial physiology modeling section for generating the physiological signals shown in FIG. 6.

FIG. 9 is a block diagram illustrating an artificial physiology modeling section for generating physiological signals (heartbeat signals) shown in FIG. 6.

A process for generating physiological signals (heartbeat signals) describes an example of the IPFM Model. The IPFM Model is concretely disclosed in "Spectral Distortion Properties of the Integral Pulse Frequency Modulation Model", a thesis of Nakao M, Morimatsu M, Mizutani Y and Yamamoto M, IEEE Trans Biomed Eng 44(5) pp 419-426, May 1997.

Referring to FIG. 9, the artificial physiology modeling section 60 (see FIG. 3) includes an integrator 61 and a comparator 62. In FIG. 9, an input signal m(t) is one corresponding to an effect of an autonomic nervous system in a pace maker such as a sinoatrial node, i e, one activating the beating of the heart, y(t) is an integration signal, x(n) is an output signal as cardiac event series. Also, r is a reference value for comparison. When the integration signal is fixed, the output signal x(n) of the artificial physiology modeling section 60 is amplified and the integrator 61 is reset to restart a heartbeat cycle.

Such an IPFM Model is used to reconstruct an impulse generation process of a nerve cell. The IPFM Model has a threshold value as given in the following [Expression 4] in a time interval between two time limits, i e, the lower time limit $t_n$ and the higher time limit $t_{n+1}$ for continuously generating pulses $$T = \int_{t_n}^{t_{n+1}} |(m_n + m(t)) dt|$$ [Expression 4]

where T denotes a threshold value representative of an original frequency of a pulse generated when the input signal m(t) becomes zero(0), $m_0$ denotes a basic heart rate when there a nerve is not controlled. At this time, the input signal m(t) contains information of an autonomic nervous system for adjusting a heartbeat interval.

A heart rate variability (HRV) signal constitutes each R-wave from electrocardiogram (ECG), and is represented as an infinitesimal pulses or a delta function.

When $t_n$ is an n-th time of R-wave, cardiac event series (CE(t)) as an output signal can be written as the following [Expression 5]

$$CE(t) = \sum_{i=0}^{i} \delta(t - t_n)$$ [Expression 5]

Physiological signals (HR SKT) generated by a series of operations are applied to the emotion generating section 30 and the motion controller 80 as shown in FIG. 6, respectively.

Figure 10:
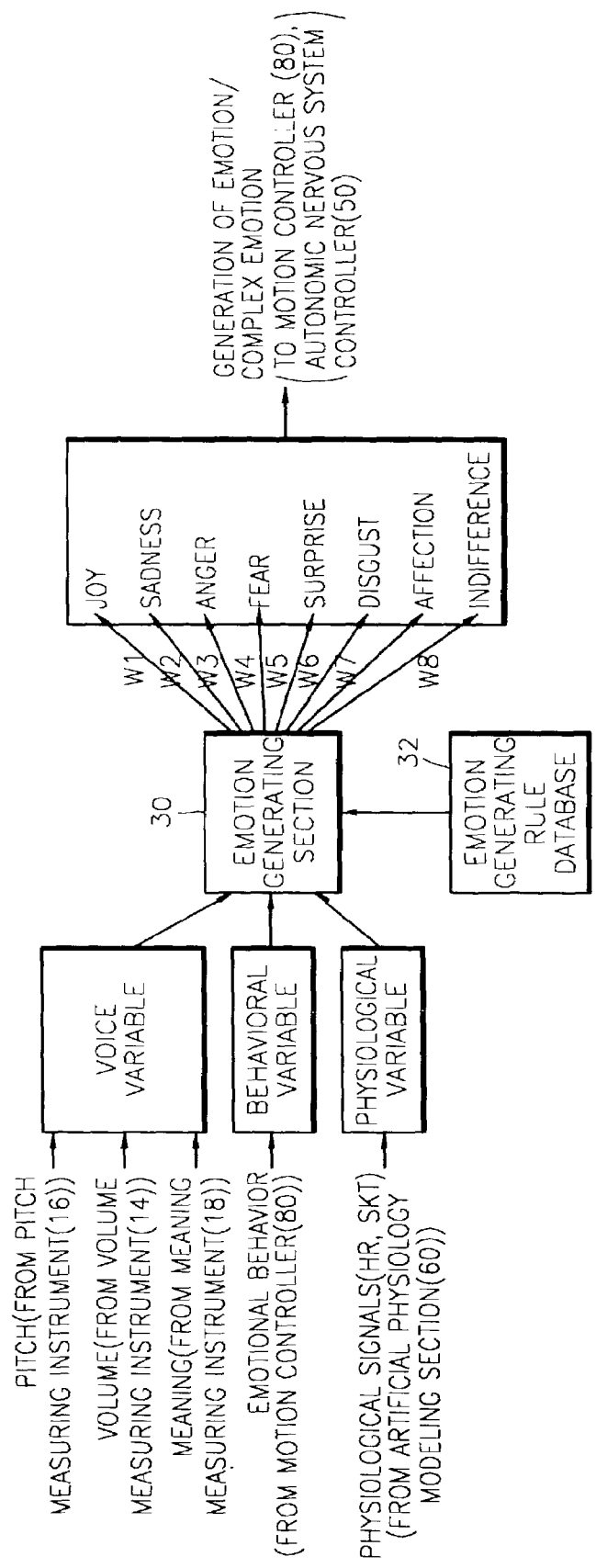
FIG. 10 is a block diagram illustrating the construction and operation of an emotion generating section shown in FIGS. 2 and 3.

FIG. 10 is a block diagram illustrating the construction and operation of an emotion generating section shown in FIGS. 2 and 3.

Referring to FIG. 10 the emotion generating section 30 is constructed from a fuzzy rule-based system for producing various types of emotions such as happiness, sadness, anger, fear, etc, according to a predefined rule for generating a motion. An emotion generating rule database 32 is connected to the emotion generating section 30 to store the predefined emotion generating rule.

A fuzzy-rule based system is an application field of artificial intelligence (AI), which is often called a computer program system having the abilities such as learning, problem-solving and reasoning in order for a computer to perform a task. A fuzzy control is an arithmetic method developed to overcome limitations in terms of a performance of hardware, which processes an uncertain portion in terms of a boundary to obtain an intermediate value, thereby providing a theoretical basis that can numerically express a linguistic logic of human beings. For this purpose, a membership function is defined which numerically expresses a linguistic manifestation of human beings with respect to an external quantity, and a conclusion is reached on the basis of relevance of the membership function.

Accordingly, the emotion generating section 30 used in the emotion synthesizing apparatus according to present invention it receives a voice variable into which a pitch (Hz), a volume (dB) and a meaning (Word) as the voice stimulus data are configured by the membership function, a behavioral variable into which actions of an arm, a leg, a neck, etc, are configured by the membership function, and a physiological variable into which the physiological signals (HR, SKT) are configured by the membership function from the stimulus sensor 10 (see FIGS. 2 and 3). Then, the emotion generating section 30 determines the type of emotions (happiness, sadness, anger, fear, surprise, disgust, affection and indifference) which is more complex and natural through the emotion generating rule database 32 configured by a fuzzy method on the basis of the voice variable, the behavioral variable and the physiological variable for application to the autonomic nervous system controller 50 and motion controller 80 of FIGS. 2 and 3 in order to feedback them.

Figure 11:
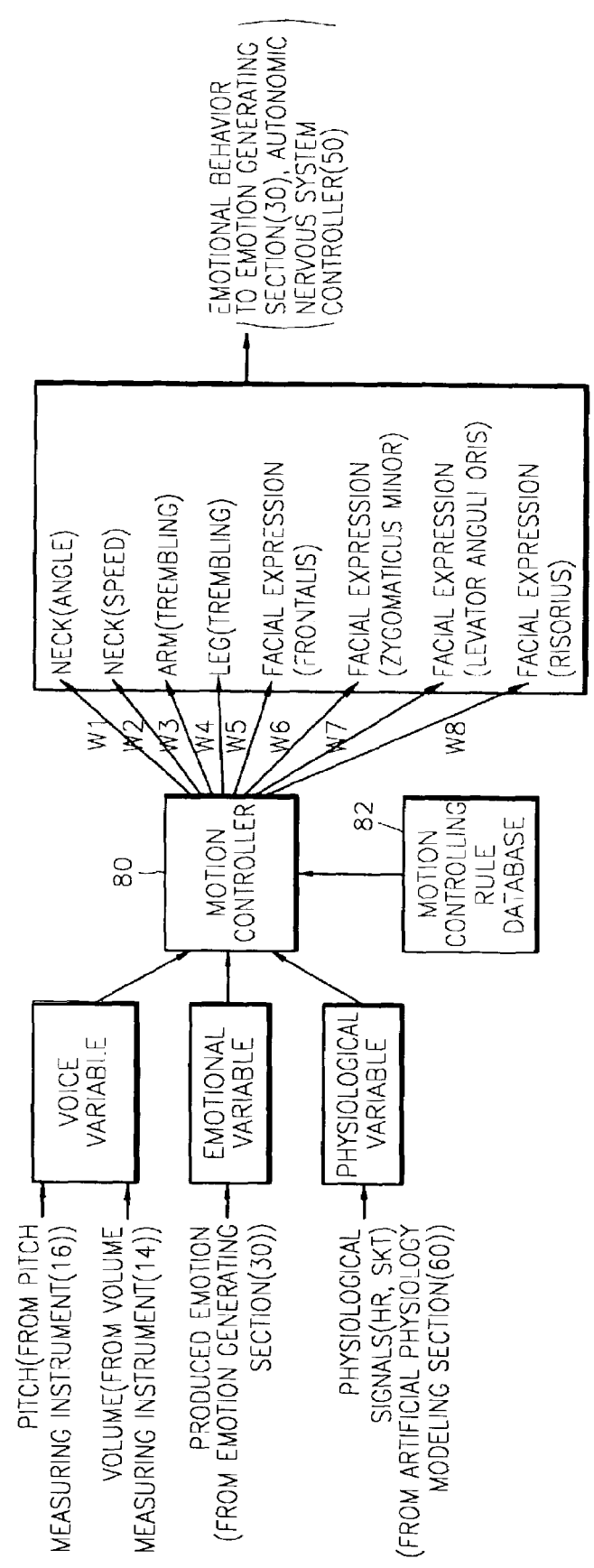
FIG. 11 is a block diagram illustrating the construction and operation of a motion controller shown in FIGS. 2 and 3.

FIG. 11 is a block diagram illustrating the construction and operation of a motion controller shown in FIGS. 2 and 3.

Referring to FIG. 11 the motion controller 80 is constructed from a fuzzy rule-based system for generating a motion such as a neck, an arm, a leg, a facial expression, etc, according to a predefined rule for controlling a motion similar to that as mentioned in the case of the emotion generating section 30 shown in FIG. 10. A motion generating rule database 32 is connected to the motion controller 80 to store the predefined motion controlling rule.

The motion controller 80 receives a voice variable into which a pitch (Hz) and a volume (dB) as the voice stimulus data are configured by the membership function, an emotional variable into which an emotion generated from the emotion generating section 30 is configured by the membership function, and a physiological variable into which the physiological signals (HR, SKT) are configured by the membership function from the stimulus sensor 10 (see FIGS. 2 and 3). Then, the motion controller 80 determines the type of behavior which is the most natural to express an emotion through the motion speed of a neck, the angle of a neck, the trembling of an arm, the trembling of a leg, and movements of parts of muscles of facial expression (frontalis, zygomaticus minor, levator anguli oris, risorius), and applies the determined behavior type to the emotion generating section 30 and the autonomic nervous system controller 50 of FIGS. 2 and 3 in order to feedback it.

Like this, the output results (the generated emotion, the physiological signals and the motions) from the emotion generating section 30, the autonomic nervous system controller 50 and the motion controller 80 are transmitted again to them with respect to one another through a feedback mechanism to combine a general behavior with an emotional behavior, Accordingly, a humanoid for the emotion synthesizing process to be applied does not express a simple emotion but a complex one in the most natural manner, and can synthesize an emotion in a manner similar to that of a human.

As described above, according to a human nervous system-based emotion synthesizing apparatus of the present invention, the use of a human nervous system emotion adjusting mechanism allows a humanoid to synthesize an emotion in a manner similar to that of a human. Also, the use of an emotion synthesizing algorithm including a feedback mechanism of a physiological signal and a emotional behavior combines a general output of a humanoid expressed in a form of the emotional behavior and physiological signal with an emotion determined by the humanoid, thereby resulting in an expression of a complex emotion.

It should be understood that an emotion synthesis according to a voice stimulus has been concretely illustrated as a preferred embodiment of the present invention, but the present invention may of course be applied to the case of an emotion synthesis according to other external stimuli such as olfaction, taste, sight and tactile sense.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A human nervous system-based emotion synthesizing apparatus for a humanoid, comprising:
   at least one stimulus sensor that senses an external stimulus;
   an emotion generator that generates a predetermined simulated emotion corresponding to the sensed external stimulus;
   a physiological signal generator that generates at least one artificial physiological signal that models a physiological response of the human body to the sensed stimulus and the generated simulated emotion, wherein the physiological response comprises a response of the autonomic nervous system of the human body, and the artificial physiological signal is generated by modeling concentrations of neurotransmitters affecting the autonomic nervous system of the human body; and
   an emotional behavior generator that generates at least one simulated emotional behavior through a predetermined physical reaction in response to the sensed stimulus and the generated simulated emotion,
   wherein the generated artificial physiological signal is fed back to the emotion generator and the emotional behavior generator, and the generated simulated emotional behavior is fed back to the emotion generator and the physiological signal generator so that the generated simulated emotion, the artificial physiological signal and the simulated emotional behavior are combined to produce a simulated complex emotion that is expressed by the humanoid.

2. The apparatus as claimed in claim 1, wherein the emotion generator comprises a fuzzy rule-based system that generates the predetermined simulated emotion from the sensed external stimulus applied thereto from the stimulus sensor, the simulated emotional behavior fed back thereto from the emotional behavior generator and the artificial physiological signal fed back thereto from the physiological signal generator according to a predefined rule.

3. The apparatus as claimed in claim 2, wherein the emotion generator further comprises a database that stores the predefined rule by which to generate the predetermined simulated emotion.

4. The apparatus as claimed in claim 1, wherein the physiological signal generator comprises:
   an autonomic nervous system controller that models a concentration of a neurotransmitter affecting the human autonomic nervous system in response to the external stimulus applied thereto from the stimulus sensor portion, the predetermined simulated emotion generated from the emotion generator and the simulated emotional behavior fed back thereto from the emotional behavior generator; and an artificial physiology modeling section that models the artificial physiological signal in response to the concentrations of the neurotransmitters modeled by the autonomic nervous system controller.

5. The apparatus as claimed in claim 4, wherein the autonomic nervous system controller models concentrations of norepinephrine (NE) and acetycholine (Ach) as the neurotransmitters affecting the human autonomic nervous system based on the Warner model.

6. The apparatus as claimed in claim 4, wherein the artificial physiology modeling section generates the artificial physiological signal in proportion to an effect on the human autonomic nervous system corresponding to the concentrations of the neurotransmitters based on the Integral Pulse Frequency Modulation (IPFM) model.

7. The apparatus as claimed in claim 4, wherein the artificial physiological signal comprises signals associated with electroencephalogram (EEG), electrooculogram (EOG), electromyogram (EMG), electrocardiogram (ECG), electrodermal activity (EDA), skin temperature (SKT), and respirations (Resp).

8. The apparatus as claimed in claim 7, wherein the artificial physiology modeling section models outputs from an artificial electroencephalograph, an artificial heart, an artificial respirator and an artificial body temperature adjustor to generate the artificial physiological signal.

9. The apparatus as claimed in claim 1, wherein the emotional behavior generator comprises:
  a motion controller that generates a control signal to control the simulated emotional behavior in response to the external stimulus applied thereto from the stimulus sensor, the predetermined simulated emotion generated from the emotion generator and the artificial physiological signal fed back thereto from the physiological signal generator; and
  a motor that generates the simulated emotional behavior through a predetermined physical reaction in response to the control signal from the motion controller.

10. The apparatus as claimed in claim 9, wherein the motion controller comprises a fuzzy rule-based system that determines the simulated emotional behavior which corresponds to the sensed external stimulus applied thereto from the stimulus sensor, the predetermined simulated emotion generated from the emotion generator and the artificial physiological signal fed back thereto from the physiological signal generator according to a predefined rule.

11. The apparatus as claimed in claim 10, wherein the motion controller further comprises a database that stores the predefined rule by which to determine the simulated emotional behavior.

12. A human nervous system-based emotion synthesizing method for a humanoid, comprising the steps of:
  (a) receiving and sensing an external stimulus;
  (b) generating a predetermined simulated emotion corresponding to the sensed external stimulus;
  (c) generating an artificial physiological signal that models a physiological response of the human body corresponding to the predetermined simulated emotion, and generating a simulated emotional behavior corresponding to the predetermined simulated emotion, respectively, wherein the physiological response comprises a response of the autonomic nervous system of the human body, and the artificial physiological signal is generated by modeling concentrations of neurotransmitters affecting the autonomic nervous system of the human body;
  (d) providing the generated artificial physiological signal and the generated simulated emotional behavior to the steps (b) and (c);
  (e) repeatedly performing the steps (b) and (c) in response to the generated predetermined simulated emotion, the artificial physiological signal and the simulated emotional behavior and then combining the generated predetermined emotion, the physiological signal and the emotional behavior together to generate a simulated complex emotion; and
  (f) expressing the generated simulated complex emotion as an appropriate simulated emotional behavior.

* * * * *